June 5, 1956  L. J. HUGHES  2,749,140
TANDEM AXLE FOR TRAILERS
Filed Jan. 18, 1954  2 Sheets-Sheet 1

INVENTOR.
LUTHER J. HUGHES
BY
*William J. Ruano*
ATTORNEY

United States Patent Office 2,749,140
Patented June 5, 1956

2,749,140

TANDEM AXLE FOR TRAILERS

Luther J. Hughes, Reading, Pa.

Application January 18, 1954, Serial No. 404,523

5 Claims. (Cl. 280—104.5)

The present invention relates to a tandem axle construction for a trailer, more particularly, a heavy duty, low bed trailer which is drawn by a tractor or truck and having sets of rear wheels arranged in tandem in a manner so as to rock about transverse axes, the wheels of each set being rotatable about longitudinal axes, thereby permitting the wheels to move up and down in longitudinal and transverse planes to compensate for road irregularities.

Common types of tandem axle constructions for heavy duty trailers usually comprise separately mounted walking beams not tied together by any appreciable cross bracing, therefore having a tendency to get out of alignment. Also, they lack the necessary rigidity and strength for extremely heavy duty trailers as well as freedom of movement to insure riding of all wheels on an irregular roadway at all times.

An object of the present invention is to provide a novel tandem axle construction which is particularly useful for low bed, heavy duty trailers, of the order of twenty tons or more load carrying capacity, which axle construction is relatively sturdy and incorporates cross bracing to maintain alignment of all parts and to impart considerable strength and load carrying capacity to the assembly as well as to insure riding of all the wheels on an irregular roadway at all times.

A more specific object of my invention is to provide a novel tandem axle construction for heavy duty trailers which includes walking beams pivotally mounted on the ends thereof for rotation about longitudinal axes to permit movement of the wheels so as to follow road irregularities, which construction is well known, but including, in addition, cross bracing elements for imparting rigidity to the walking beams with substantially universal movement of the wheel mountings to enable the lowermost tilted wheels to ride on depressions in the roadway at all times, also including adjustable means for adjustably varying the spacing or distance between the cross bracing elements since there is tendency for variation of this distance as the result of wear and use.

Another specific object of the invention is to provide a novel, telescoping construction of the cross bracing elements to permit easy mounting of the brake cylinders and their placement in a protected position underneath and inwardly of the trailer bed.

Other objects and advantages of the present invention will be apparent from a study of the following description, taken with the accompanying drawings wherein.

Figure 1:
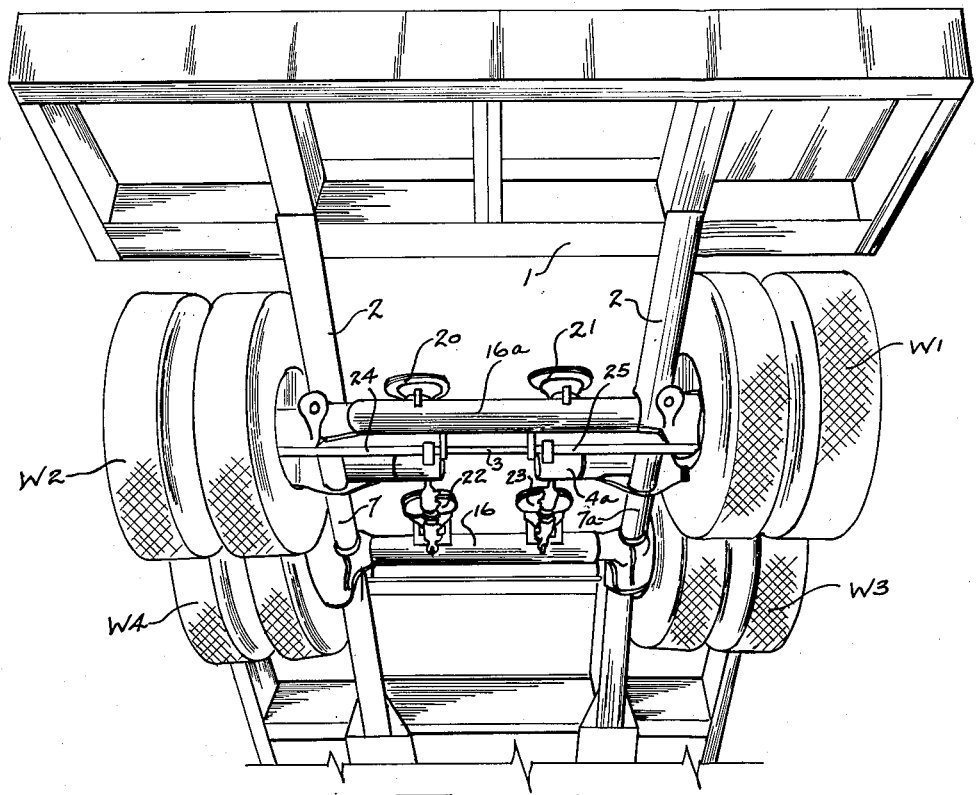
Figure 1 is a bottom perspective view of a low bed trailer having a tandem axle construction embodying the principles of my invention.

Referring more particularly to Figure 1 numeral 1 denotes the frame of a low bed trailer adapted to be drawn by a tractor (not shown) and having longitudinal frame members 2 interconnected by a plurality of transversely extending frame members, such as 3. Rigidly fastened underneath one of the transverse frame members 3 are two pairs of brackets 4, 4 and 4a, 4a (only one of each pair being shown) which are adapted to support bearing members or pins having flattened heads and long shank portions extending through the pairs of supporting brackets and having threaded ends on which are screw threadedly mounted bolts. These bearing pins extend through transverse bores of walking beams 7 and 7a, respectively, for pivotal movement of the beams about transverse axes.

On the ends of the walking beams 7 and 7a, there are provided spindle portions on which are swivelly mounted housing members 10, 11 and 10a, 11a, respectively, to which are secured wheel hubs 12, 13 and 12a, 13a, respectively, as well as the wheel spindles 14, 15 and 14a, 15a, respectively. Housing members 10 and 10a are interconnected by means of a sleeve 16 telescopically fitted about a stub portion of housing member 10 to which the sleeve 16 is shrunk fit and welded about perimeter 19, and by a stub portion 18 of housing member 10a which is freely slidable in a longitudinal direction with respect to sleeve 16. Similarly, a sleeve 16a is rigidly secured by a shrink fit to stub portion of the housing member 11a, and by welding about the joint 19a, and is freely slidable with respect to and telescopically fitted onto stub portion 18a of housing member 11. Thus sleeves 16 and 16a act essentially as axles for dual wheels W1, W2, W3 and W4 which are mounted on each of the spindles 15a, 15, 14a and 14, respectively, as shown more clearly in Figure 1. The above described tandem axle construction, is described in more detail in my earlier Patent 2,615,728 dated October 28, 1952, and avoids the tendency of the axle to run out of line, and provides both longitudinal and crosswise full oscillation, maintaining equal bearing on all tires at all times, thus reducing excess tire wear. Brake cylinders 20, 21, 22 and 23, of well known construction, are provided and mounted on sleeves 16 and 16a as shown in Figures 1 and 2 and provide braking forces acting through two brake linkages such as 24 and 25 (one pair not being shown).

An important feature of the invention resides in the provision of turnbuckles T1, T2, T3 and T4 between the stationary walking beam bearings 4—4a and the sleeves 16 and 16a to adjustably vary the distance therebetween. Each of the turnbuckles is of the same construction so that a detailed description of one will suffice. Turnbuckle T1 comprises cup shaped members 28 and 29 which are threaded internally and are screw threaded to a threaded shaft having a nut 30 integrally secured thereto and which may be adjustably turned in either direction. After turning nut 30 the proper amount for either separating or bringing together bracket 4 and sleeve 16, nuts 31 may be tightened to maintain the adjustment. Members 28 and 29 are connected to bracket 4 and sleeve 6 through eyes 32 and 33. The end portions of walking beams 7 and 7a are slidably mounted within housing 10, 10a, 11, 11a to permit relative movement therebetween during adjustment.

Figure 3:
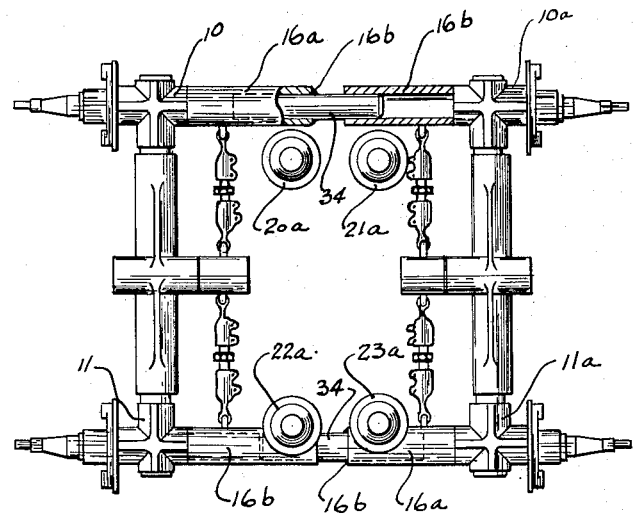
Figure 3 is a top plan view of the tandem axle construction showing a modified form of the telescoping cross bracing construction for providing a substantially greater stationary support for the brake cylinders.

Figure 3 shows a modification of the invention, that is a modification of the cross bracing element construction which takes the form of two short sleeves 16a and 16b having outer ends welded to housings 10, 10a, 11, 11a. The inner ends of sleeves 16a are welded at 16b to a solid male shaft 34 whose free end is telescopically fitted for relative longitudinal sliding movement in sleeve 16b. Air cylinders 20a, 21a, 22a, and 23a for operating the brakes are mounted on the respective sleeve members 16a and 16b since they are relatively long and provide adequate support in an inwardly located position for the cylinders.

Figure 2:
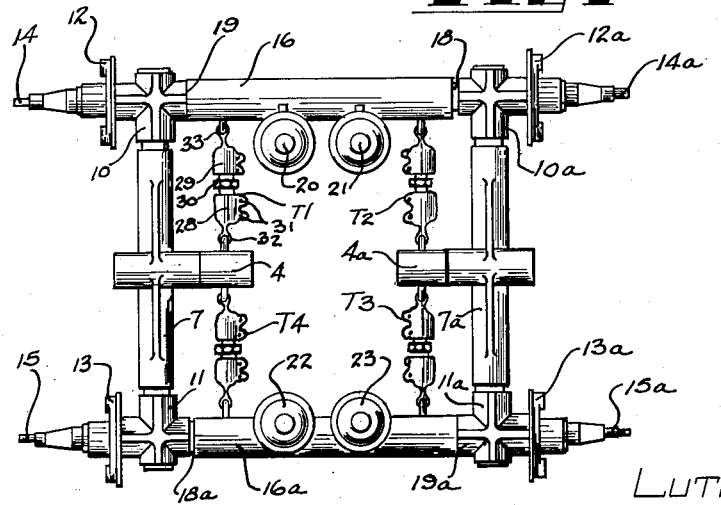
Figure 2 is a top plan view of the tandem axle construction shown in Figure 1 and more clearly illustrating the turnbuckle means for adjustably varying the distance between the stationary walking beam-supporting brackets and the cross bracing elements and involving one of the features of the present invention.
Figure 4:
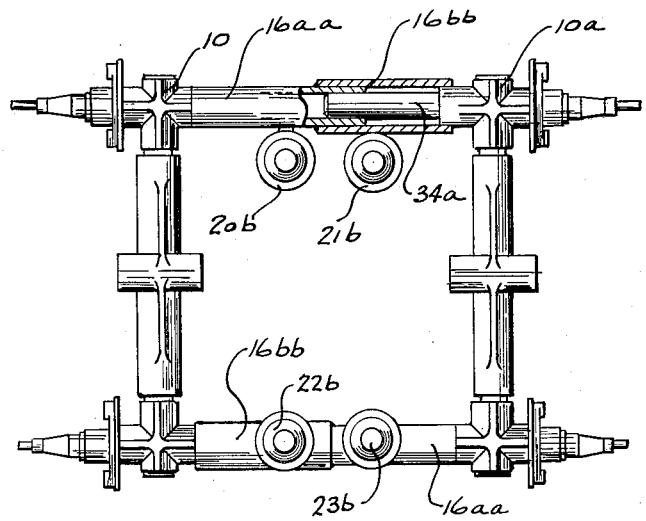
Figure 4 is a top plan view of the tandem axle construction but showing a still further modified form of telescoping cross bracing elements to provide a more ample and more protected support for the brake cylinders.

Figure 4 shows a further modification of the invention which is similar to the construction shown in Figures 1 and 2 except that the turnbuckles are omitted and a different construction of the cross bracing element is provided for furnishing suitable support for the air-chambers for the brakes. Sleeve 16aa has an outer end welded to housing 10 and an inner end slidably fitting within sleeve 16bb whose outer end is likewise welded to housing 10a. A solid male member 34a welded to housing 10a slidably fits within the inner end portion of sleeve 16aa. Air-chambers 20b, 21b, 22b and 23b are mounted on the various sleeves 16aa and 16bb since each of them is sufficiently long and extends sufficiently inwardly to provide adequate and protected support for the various air-chambers.

Thus, it will be seen that I have provided a tandem axle for trailers including turnbuckle adjusting means between the sleeve-like cross bracing elements and the stationary bracket which provides a transverse axis on which the walking beams are pivotally mounted, thereby permitting adjustment and realignment of such sleeves which may have gotten out of alignment from wear or from an accident; also, I have provided cross bracing elements with sufficient lengths of relatively stationary sleeves to provide adequate support for the air-chambers for the brakes and at the same time to permit such chambers to be located inwardly or substantially centrally instead of outwardly where it would otherwise be vulnerable to damage.

While I have illustrated and described several specific embodiments of my invention, it will be understood that these are by way of illustration only, and that various changes and modifications may be made within the contemplation of my invention and within the scope of the following claims.

I claim:
1. A tandem axle construction for trailers, comprising a pair of walking beams pivotally mounted substantially centrally thereof on axes extending transversely of the trailer to enable pivotal movement of said beams in vertical longitudinal planes, two pairs of members, each pair swivelly mounted on opposite end portions of said walking beams and longitudinally slidable on said end portions, wheel-carrying axle portions rigidly secured to said last mentioned members, transversely extending, relatively slidable elements integrally secured to each of said members for joining both transversely disposed pairs of members for forming the front and rear axles, respectively, for maintaining said axles at right angles to said walking beams at all times, and for increasing the distance between the transversely disposed elements as the wheel axle tilts in a transverse vertical plane to compensate for road irregularities by insuring riding of all wheels on an irregular surfaced roadway at all times, and a plurality of adjusting means, each having an end mounted on one of said elements for relative rotative movement about the longitudinal axes of the adjusting means for adjustably varying the distance between said transversely extending walking beam axis and the axes of said elements to compensate for non-alignment or lack of parallelism of said axles.

2. A tandem axle construction as recited in claim 1 wherein stationary brackets are provided to serve as pivotal supports to provide said transverse pivotal axis of said walking beams, and wherein said adjusting means comprises turnbuckles having ends which are provided with eyes for linking with eyes mounted on said stationary brackets and on said elements.

3. A tandem axle construction for trailers comprising a pair of walking beams pivotally mounted substantially centrally thereof on axes extending transversely of the trailer to enable pivotal movement of said beams in vertical longitudinal planes, two pairs of housing members, each pair swivelly mounted on opposite end portions of said walking beams, wheel-carrying axle portions rigidly secured to said last mentioned members, telescoping means including transversely extending sleeve elements integrally secured to each of said housing members for joining each pair of said members to form the front and rear axles, respectively, and for maintaining them at right angles to said walking beams at all times, there being relative longitudinal sliding movement in a transverse direction of the parts of said telescoping means for increasing the distance between the sleeve elements as the wheel axle tilts in a transverse vertical plane to compensate for road irregularities by insuring riding of all wheels on an irregularly surfaced roadway at all times, each pair of sleeve elements having inner ends extending toward each other for a distance which is substantially half the total distance between the corresponding housing members to which their outer ends are integrally secured, and four brake operating cylinders, each directly mounted on one of said four sleeve elements.

4. A tandem axle construction as recited in claim 3 together with a solid male member having one end integrally secured to an inner end portion of one of said sleeve elements of each pair and having another end slidably movable within the inner end portion of the other of said sleeve elements of each pair, to permit the distance between transversely opposite housings to increase or decrease and thus compensate for road irregularities.

5. A tandem axle construction as recited in claim 3 wherein one of said transversely disposed housing members of each pair has integrally secured thereto a transversely extending member whose inner end is slidably mounted within the inner end portion of the cooperating telescopically fitted element, and wherein the same housing has integrally secured thereto one of said sleeve elements, constituting the other telescopically fitted element and whose inner end portion is telescopically fitted over the inner end portion of said cooperating telescopically fitted element, and wherein brake operating air cylinders are directly mounted on at least certain of said telescopically fitted elements.

References Cited in the file of this patent
UNITED STATES PATENTS

| | | |
|---|---|---|
| 2,303,501 | Ronk | Dec. 1, 1942 |
| 2,577,322 | Frazier | Dec. 4, 1951 |
| 2,615,728 | Hughes | Oct. 28, 1952 |